United States Patent [19]

Brook

[11] Patent Number: 4,770,260
[45] Date of Patent: Sep. 13, 1988

[54] CONVEYOR SYSTEMS

[75] Inventor: Richard M. Brook, Netherton, England

[73] Assignee: Autosystems Limited, England

[21] Appl. No.: 100,112

[22] Filed: Sep. 23, 1987

[30] Foreign Application Priority Data

Sep. 25, 1986 [GB] United Kingdom ............... 8623126
Nov. 18, 1986 [GB] United Kingdom ............... 8627538

[51] Int. Cl.⁴ .................... G01G 19/00; G01G 19/02; B07C 5/16
[52] U.S. Cl. .................................. 177/145; 177/163; 198/504; 209/592
[58] Field of Search ............... 177/145, 163; 198/504; 209/592-595

[56] References Cited

U.S. PATENT DOCUMENTS

| | | | |
|---|---|---|---|
| 3,035,696 | 5/1962 | Campbell | 209/595 |
| 3,918,587 | 11/1975 | Drew, Jr. | 177/163 UX |
| 4,254,877 | 3/1981 | Rose | 177/145 X |
| 4,437,561 | 3/1984 | Hasegawa et al. | 198/504 |
| 4,711,344 | 12/1987 | Altenpohl | 177/163 X |

FOREIGN PATENT DOCUMENTS

| | | |
|---|---|---|
| 430861 | 6/1934 | United Kingdom . |
| 1336075 | 4/1971 | United Kingdom . |
| 2008778 | 11/1978 | United Kingdom . |
| 2049963 | 12/1981 | United Kingdom . |
| 2094011 | 2/1982 | United Kingdom . |

*Primary Examiner*—George H. Miller, Jr.
*Attorney, Agent, or Firm*—W. Thad Adams, III

[57] ABSTRACT

A conveyor system comprises a plurality of article carriers 5 interconnected for movement in succession along a predetermined path 1, and weight sensing means 7a, 7b positioned at two or more weighing stations in the path such that each article carrier passes through one weighing station, the weight of the article carrier, together with that of any article carried thereby, being applied to the weight sensing means. The use of two weighing stations, to which articles can be diverted alternatively, means that ample time can be allowed for accurate weighing, even if the speed of the article carriers is greater than that with prior art devices.

8 Claims, 5 Drawing Sheets

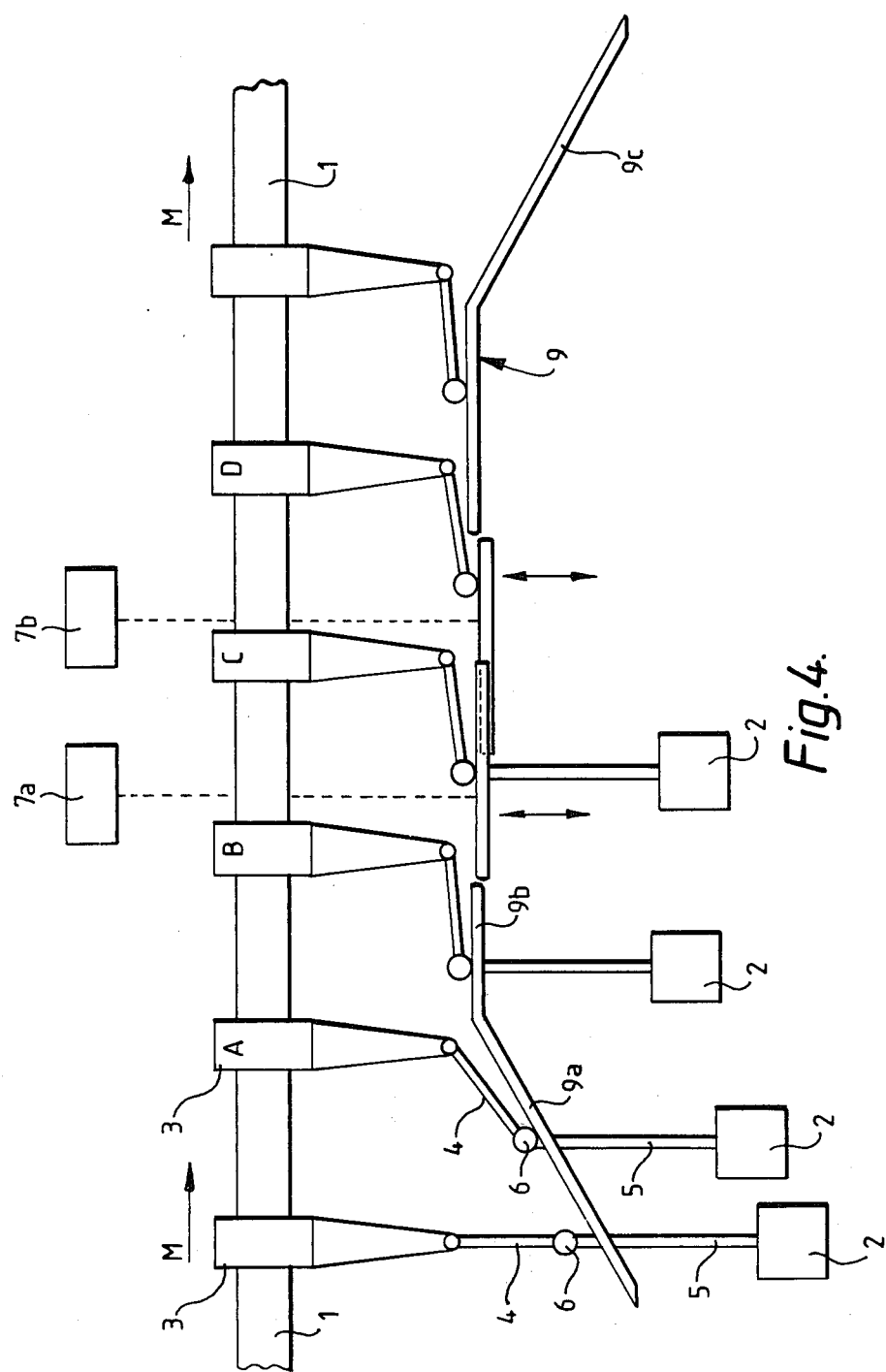

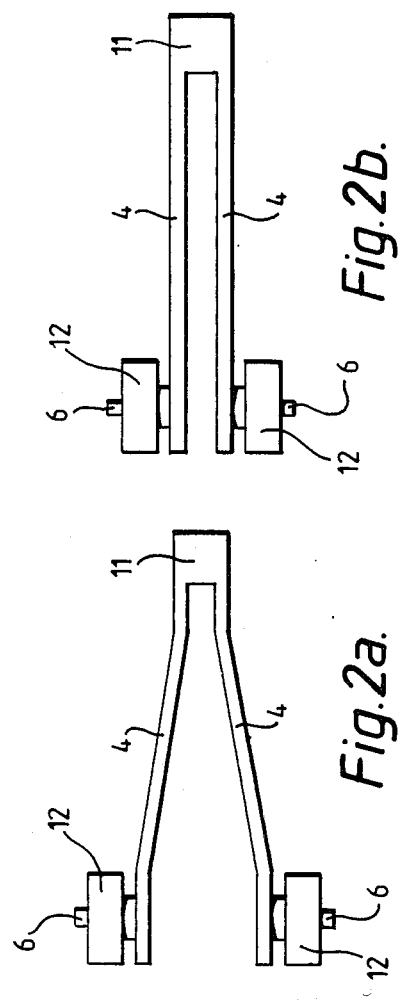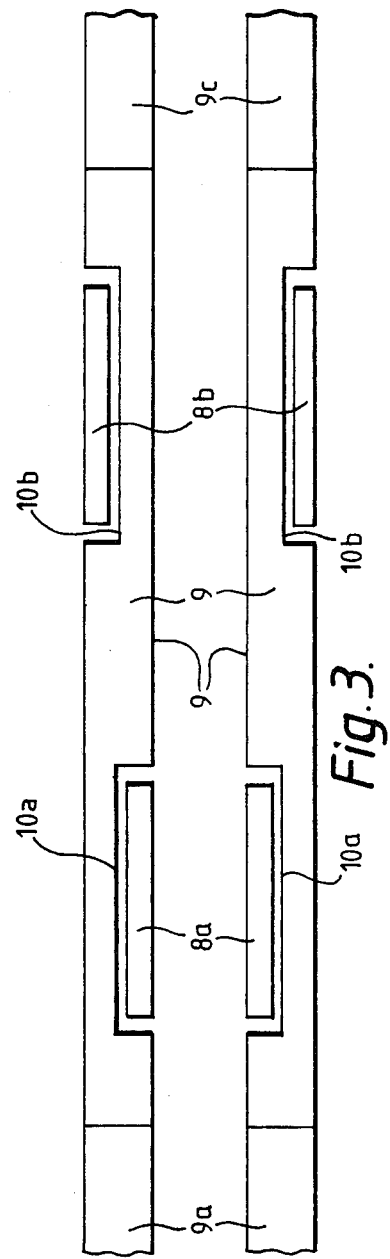

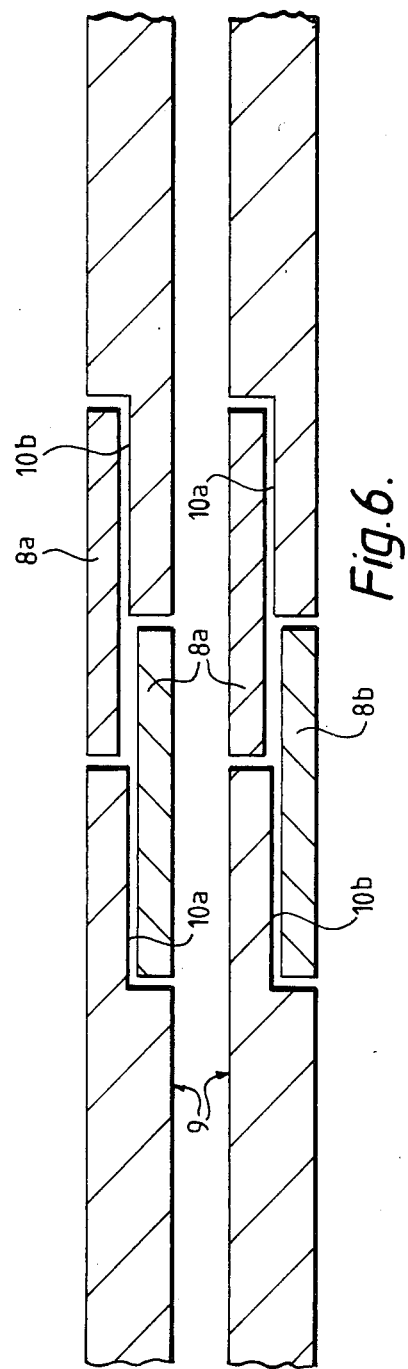
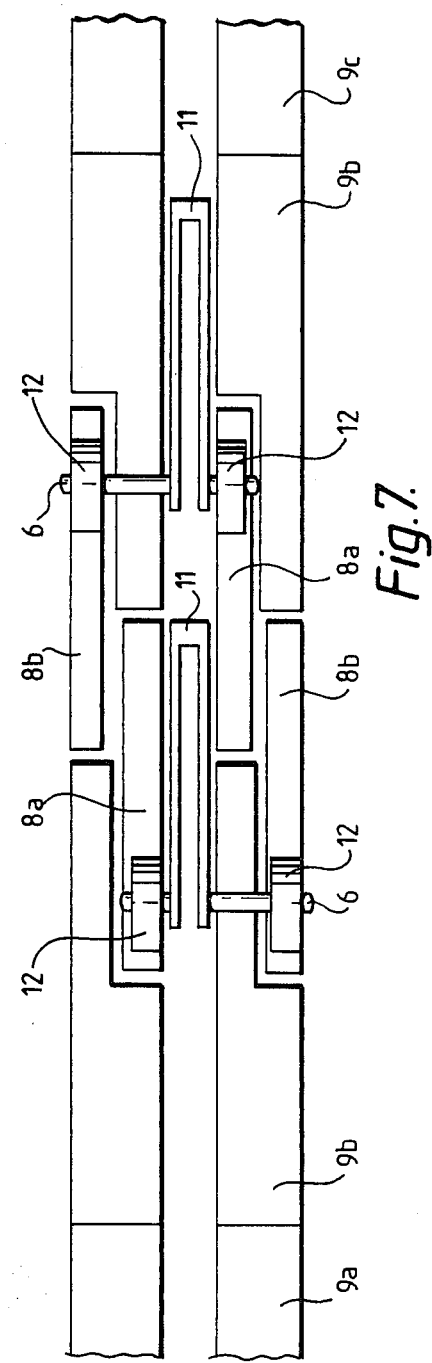

CONVEYOR SYSTEMS

The invention relates to conveyor systems and particularly to conveyor systems comprising a plurality of article carriers interconnected for movement in succession along a pre-determined path, and weight sensing means positioned at a weighing station in the path such that the weight of each article carrier together with that of any article carried thereby is applied to the weight sensing means.

An example of such a conveyor system may be found in U.K. Pat. No. 1551701, the subject matter of which is incorporated herein by reference.

It takes a significant finite time for an article carrier to pass through a weighing station and be accurately weighed thereby. A typical use for such a conveyor system is in the weighing and sorting of poultry carcasses and as desired production rates rise, faster throughput and faster weighing is desired. However, the shorter the time allowed for weighing the more likely that the weighing will be inaccurate.

We have now realised that faster, more accurate weighing can be produced, by the surprisingly simple expedient of effectively diverting the article carriers to two or more weighing stations, so that the article carriers can travel at the same or greater speeds, but weighing of at least two article carriers can take place either simultaneously, or during periods of time which overlap.

Accordingly, the invention provides a plurality of article carriers interconnected for movement in succession along a predetermined path, and weight sensing means positioned at two or more weighing stations in the path such that each article carrier passes through one weighing station, the weight of the article carrier, together with that of any article carried thereby, being applied to the weight sensing means.

Further objects and advantages of the invention will become apparent from the following description of embodiments of the invention, which are given by way of example, with reference to the accompanying drawings, in which:

FIG. 2a is a view of part of an article carrier from a first set;

FIG. 2b is part of an article carrier from a second set;

FIG. 3 is a plan view of an inclined track of the conveyor system;

FIG. 4 is a side view of a second embodiment of conveyor system according to the invention;

FIG. 6 is a view of the inclined track of the second embodiment; and

FIG. 7 is a plan view of the track of the second embodiment shown supporting one article carrier of a first set and one article carrier of a second set.

Figure 1:
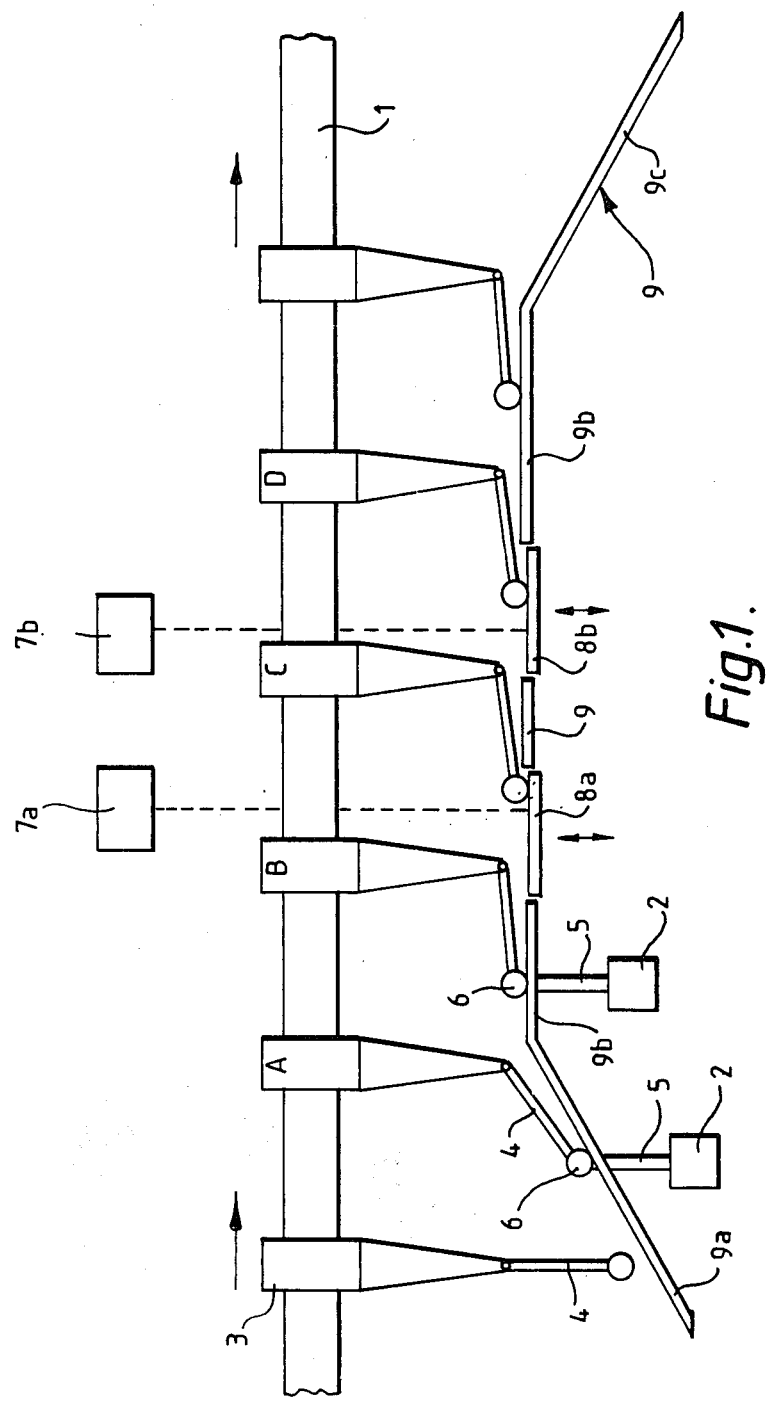
FIG. 1 is a side view of a first embodiment of conveyor system according to the invention.

Referring first to FIG. 1, there is shown a conveyor system comprising a continuous tubular rail 1 along which a succession of poultry carcass carrying shackles 2 are drawn by an endless chain (not shown). The shackles are supported by rollers 3 which run on the rail 1, the rollers and shackles being connected together by rods 4 and 5 which are linked by a pair of eyes 6.

Fixed below the rail 1, and below each of the eyes 6, are two parallel fixed support rails 9, each of which has a horizontal central portion 9b having a downwardly inclined ramp 9a, 9c, fixed to each end.

Each of the central portions 9b has one, inward facing recess 10a and one outward facing recess 10b, as illustrated in FIG. 3. The first pair of recesses 10a contains a pair of movable support rails 8a and the second pair of recesses 10b contains a similar pair of movable support rails 8b.

Mounted directly above each pair of movable support rails are two weigh cells 7a and 7b, one cell for each pair of rails. In use, a pair of eyes 6 travels across a movable support rail and, as a consequence, displaces the rail slightly. This displacement is sensed by the associated weigh cell, which then determines the weight of the shackle 2 and any carcass carried thereon.

As will be appreciated from FIGS. 2a and 2b, there are two separate sets of article carriers, each having a different rod structure 4.

Each rod structure is in the form of a pair of rods connected at the upper end 11. At their free ends, each rod has an eye 6 which retains a narrow support roller 12.

As can be seen from FIGS. 2a and 2b, the rollers 12 of the first set are spaced further apart, and thus have a different lateral displacement with respect to the path than do the rollers 12 of the second set.

The plates 8a and 8b also have different lateral spacings with respect to the path, the lateral spacing of the plates 8a corresponding to the spacing of the rollers 12 of the FIG. 2b carrier, whereas the lateral spacing of the places 8b corresponds to the spacing of the rollers 12 of the FIG. 2a carrier.

The rollers 3 move along the rail 1 from left to right as shown in FIG. 1. Initially the rods 4 and 5 freely hang in a vertical orientation but, with passage of time, each pair of rollers 12 impinges upon the first ramp portion 9a. The rollers ride up the ramp portion and the rods adopt the attitude of the carrier A seen in FIG. 1. Once the rollers have travelled up the ramp 9a they move horizontally along the central portion 9b, as illustrated by the carrier B in FIG. 1. Each carrier of the form shown in FIG. 2 passes over the rails 8b and is weighed thereby. Each carrier having the form shown in FIG. 2b passes over the rails 8a, and is weighed thereby. The carriers shown in FIGS. 2a and 2b alternate along the conveyor. Thus weigh cell 7b can be weighing carrier D as shown in FIG. 1 at the same time as weigh cell 7a is weighing carrier C. Thus greater time can be allowed for the weighing of each article carrier, even if the speed of the article carriers is greater than with known systems in which only one weighing station is used.

While the embodiment shown in FIGS. 1 to 3 represents a significant improvement over prior art devices, it does require two different forms of article carrier, and the spacing of the rollers 12 shown in FIG. 2a is equal to that of the entire rail system 9, which is quite significant. There is therefore a risk that the article carriers shown in FIG. 2a may foul on other items of equipment at other parts of the conveyor system, or may show an increased tendency to jamming.

We have therefore developed an alternative embodiment in which identical article carriers are used, with rollers having the same spacing, except that the rollers of one set of carriers are offset to one side of the path and the rollers of an alternating set are offset to the other side of the path. This produces a system in which, although the rollers have a spacing greater than that shown in FIG. 2b, the spacing is nevertheless less than that shown in FIG. 2a.

This alternative system is shown in FIGS. 4 to 7.

Once again there is a continuous tubular rail 1 along which a succession of poultry carcass carrying shackles 2 is drawn in the direction of the arrows MM by an endless chain (not shown). The shackles are supported by rollers 3 which run on the rail, the rollers and shackles being connected together by two links 4 and 5 which are pivotally connected together at 6.

Fixed below the rail 1, and below each of the connections 6, are two parallel fixed support rails 9 each of which has a horizontal central portion 9b having a downwardly inclined ramp 9a, 9c fixed to each end.

Each of the central portions 9b has one, inward facing recess 10a, and one outward facing recess 10b, as illustrated in FIG. 6. The first pair of recesses 10a contains a pair of movable support plates 8a, and the second pair of recesses 10b contains a similar pair of plates 8b.

The width of each of the recesses is substantially half the width of each of the support plates 9. The inward facing recess 8a of one support plate and the outward facing recess 8b of the other support plate are in longitudinal alignment and inward and outward facing recesses of each support plate are longitudinally spaced from each other, so that the central portion 9b of the support plate has a gap across its centre, again as seen in FIG. 6.

Mounted above each pair of movable plates are two weigh cells 7a and 7b, one cell for each pair of plates. In use, each connection 6 travels across a movable support plate, and as a consequence, displaces the weight slightly for weighing purposes.

Figure 5:
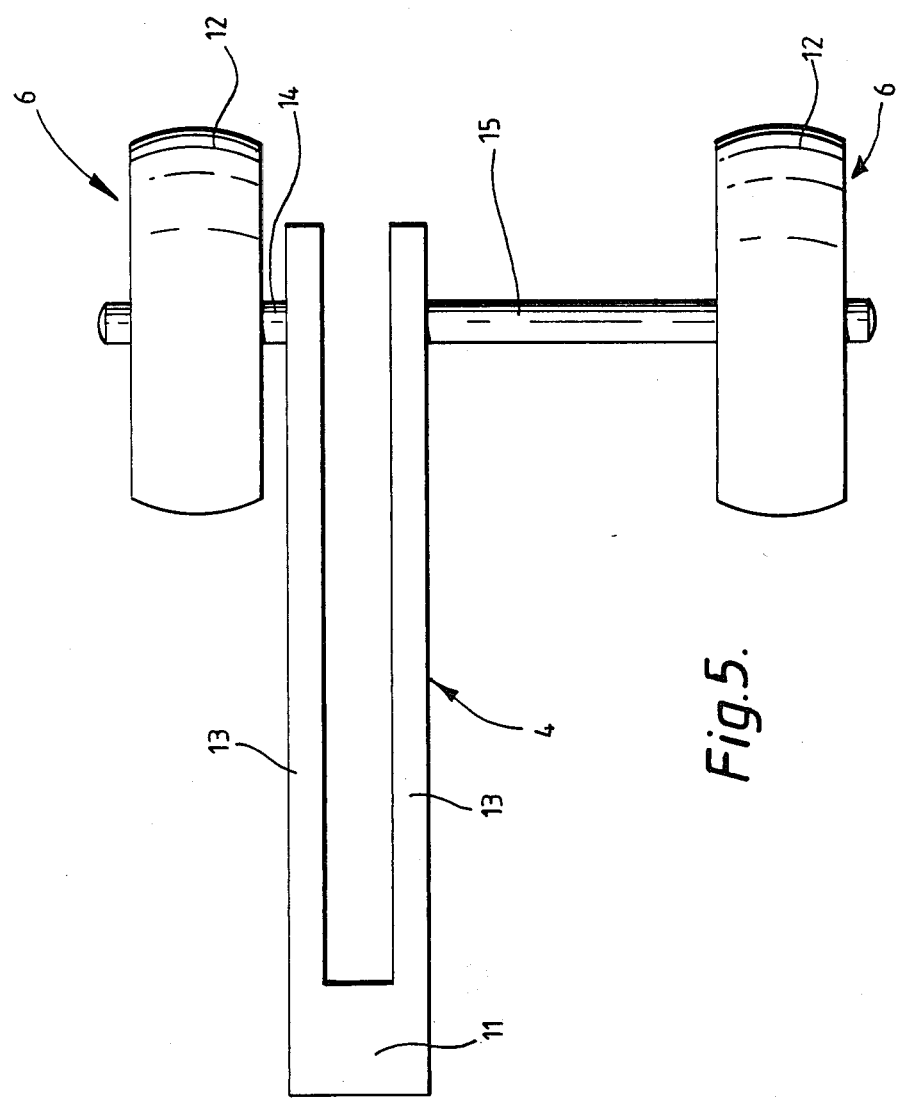
FIG. 5 is a view of part of an article carrier of one set of the second embodiment.

FIG. 5 shows one link 4 and connection 6 in more detail. Each link 4 has two arms 13 connected at their upper end 11. From the three ends of the arms 13 project respectively shafts 14 and 15. Shaft 15 is longer than shaft 14. Each shaft carries a support roller 12.

FIG. 7 shows that the separation of the rollers 12 are substantially the same as the separation of the movable plates 8a and 8b. It also shows that alternate shackles have the shafts 14 and 15 transposed, so that the rollers of one shackle are laterally staggered with respect to the rollers of adjacent shackles.

In use, the rollers 3 move along the rail in a similar manner to that of the first embodiment. Because of the staggering of the rollers of alternate shackles, alternate shackles are supported by alternate pairs of support plates, and are hence weighed by alternate weigh stations.

Because two weigh stations are in operation simultaneously, greater speed of throughput can be achieved while at the same time allowing ample time of the weighing operation to be carried out accurately.

The second embodiment possess two distinct advantages over the first embodiment. In particular, only one type of link needs to be manufactured, as it can be used in a left hand orientation or a right hand orientation, to provide the necessary staggering. In this way it is possible to achieve a cost saving in the manufacture of the conveyor system.

Furthermore, the distance between each pair of rollers 12 is less than that shown in FIG. 2a, thus substantially reducing the risk of jamming, for example by fouling on other items of equipment on the conveyor line.

The invention is not restricted to the details of the aforegoing embodiments, and the invention may for example be utilised with more than two weighing stations, and more than two pairs of movable weighing plates or rails.

What is claimed is:

1. A conveyor system comprising a plurality of article carriers interconnected for movement in succession along a predetermined path, and weight sensing means positioned at two or more weighing stations in the path in an asymmetrical position with respect to the path such that each article carrier passes through one weighing station, the weight of the article carrier, together with that of any article carried thereby, being applied to the weight sensing means.

2. A conveyor system as claimed in claim 1, in which each article carrier has abutment means and each weight sensing means has engagement means, there being a first set of article carriers each having its abutment means spaced laterally of the path by a first distance, and a second set of article carriers each having its abutment means spaced laterally of the path by a second distance, a first weight sensing means having its engagement means spaced laterally of the path by said first distance, to co-operate with said first set of article carriers, and a second weight sensing means having its engagement means spaced laterally of the said path by said second distance, to co-operate with said second set of article carriers.

3. A conveyor system as claimed in claim 2, in which each article carrier has a pair of spaced apart abutment means.

4. A conveyor system as claimed in claim 3, in which the abutment means of each article carrier of the first set are spaced further apart than the abutment means of each article carrier of the second set.

5. A conveyor system as claimed in claim 3, in which the abutment means of each article carrier have substantially the same spacing, but the abutment means of the first set of article carriers are displaced laterally to one side of the path and the abutment means of the second set of article carriers are displaced laterally to the other side of the path.

6. A conveyor system as claimed in claim 3, in which each pair of abutment means comprises a pair of rollers.

7. A conveyor system as claimed in claim 2, in which each engagement means comprises a section of rail arranged to receive and temporarily support an article carrier.

8. A conveyor system as claimed in claim 1, in which there are two weighing stations.

* * * * *